US009766855B2

(12) United States Patent
Lapidot et al.

(10) Patent No.: US 9,766,855 B2
(45) Date of Patent: Sep. 19, 2017

(54) METHOD AND APPARATUS FOR CONTROLLING SURVEILLANCE SYSTEM WITH GESTURE AND/OR AUDIO COMMANDS

(71) Applicant: Avigilon Corporation, Vancouver (CA)

(72) Inventors: Uriel Lapidot, Vancouver (CA); Elliot Rushton, Vancouver (CA); Matthew Adam, Vancouver (CA)

(73) Assignee: Avigilon Corporation, Vancouver (CA)

( * ) Notice: Subject to any disclaimer, the term of this patent is extended or adjusted under 35 U.S.C. 154(b) by 529 days.

(21) Appl. No.: 14/022,947

(22) Filed: Sep. 10, 2013

(65) Prior Publication Data

US 2015/0074532 A1 Mar. 12, 2015

(51) Int. Cl.
| | |
|---|---|
| G06F 3/048 | (2013.01) |
| G06F 3/16 | (2006.01) |
| G06F 3/01 | (2006.01) |
| G10L 15/22 | (2006.01) |
| H04N 7/18 | (2006.01) |
| G06K 9/00 | (2006.01) |
| G06F 3/00 | (2006.01) |
| G06F 3/03 | (2006.01) |

(Continued)

(52) U.S. Cl.
CPC ............ G06F 3/167 (2013.01); G06F 3/005 (2013.01); G06F 3/017 (2013.01); G06F 3/0304 (2013.01); G06K 9/00355 (2013.01); G10L 15/22 (2013.01); H04N 7/181 (2013.01); H04N 7/188 (2013.01); *G06F 2203/0381* (2013.01); *G06K 9/00771* (2013.01); *G08B 13/1963* (2013.01); *G10L 15/26* (2013.01); *G10L 2015/223* (2013.01)

(58) Field of Classification Search
CPC ......... G06F 3/0484; G06F 3/017; G06F 3/167
USPC ....................................................... 715/719
See application file for complete search history.

(56) References Cited

U.S. PATENT DOCUMENTS 6,396,523 B1 * 5/2002 Segal ................... G06F 1/1626
345/173
6,718,308 B1 * 4/2004 Nolting ........................ 704/275
(Continued)

FOREIGN PATENT DOCUMENTS

JP WO 2012121404 A1 * 9/2012 ............. G06F 3/017

OTHER PUBLICATIONS

"Computer Vision for Multimedia Applications: Methods and Solutions", take from Google Books, published Oct. 31, 2010, pp. c, 52.*

*Primary Examiner* — William Bashore
*Assistant Examiner* — Gregory A Distefano
(74) *Attorney, Agent, or Firm* — Klarquist Sparkman, LLP (57) ABSTRACT

A computer-implemented method controls aspects of a surveillance system using gestures and/or voice commands, and comprises: receiving one or both of an operator's skeleton input data and voice input data from a gesture detection camera and a microphone; using a processor, matching one or both of the received skeleton input data with a gesture stored in a database and the received voice input data with a text string stored in the database; matching one or both of the gesture and text string to a corresponding video management program command stored on the database; and transmitting the one or more video management program commands to a video management program of the surveillance system.

38 Claims, 3 Drawing Sheets

(51) Int. Cl.
  *G10L 15/26* (2006.01)
  *G08B 13/196* (2006.01)

(56) References Cited

U.S. PATENT DOCUMENTS

| | | | |
|---|---|---|---|
| 7,394,346 B2 | 7/2008 | Bodin | |
| 7,840,912 B2 | 11/2010 | Elias et al. | |
| 7,945,076 B2* | 5/2011 | DeLean | 382/118 |
| 7,948,357 B2 | 5/2011 | Bodin | |
| 8,489,065 B2 | 7/2013 | Green et al. | |
| 2005/0271279 A1* | 12/2005 | Fujimura | G06K 9/00355 |
| | | | 382/203 |
| 2008/0163130 A1 | 7/2008 | Westerman | |
| 2010/0231522 A1* | 9/2010 | Li | G06F 3/0423 |
| | | | 345/169 |
| 2010/0306716 A1* | 12/2010 | Perez | A63F 13/213 |
| | | | 715/863 |
| 2011/0065459 A1 | 3/2011 | Cheng | |
| 2011/0107220 A1 | 5/2011 | Perlman | |
| 2011/0173204 A1* | 7/2011 | Murillo et al. | 707/741 |
| 2011/0181526 A1* | 7/2011 | Shaffer | G06F 9/4443 |
| | | | 345/173 |
| 2011/0252375 A1* | 10/2011 | Chaudhri | 715/835 |
| 2011/0289456 A1* | 11/2011 | Reville | G06F 3/017 |
| | | | 715/830 |
| 2012/0206339 A1* | 8/2012 | Dahl | 345/156 |
| 2012/0242800 A1* | 9/2012 | Ionescu et al. | 348/46 |
| 2012/0284622 A1* | 11/2012 | Avery et al. | 715/719 |
| 2013/0080898 A1* | 3/2013 | Lavian et al. | 715/728 |
| 2013/0176220 A1* | 7/2013 | Merschon et al. | 345/158 |
| 2013/0267204 A1* | 10/2013 | Schultz et al. | 455/411 |
| 2014/0119640 A1* | 5/2014 | Craig | G06K 9/6217 |
| | | | 382/159 |

* cited by examiner

METHOD AND APPARATUS FOR CONTROLLING SURVEILLANCE SYSTEM WITH GESTURE AND/OR AUDIO COMMANDS

FIELD

This disclosure relates generally to controlling a surveillance system with gesture and/or audio commands.

BACKGROUND

Controlling various functionalities of a digital surveillance system using standard input devices like a keyboard, joystick and/or mouse can be restrictive and slow. An operator needs to physically manipulate the standard input device to use the various functionalities of the system and to be able to view surveillance data. The learning curve for using a surveillance system using such input devices can be steep. Further, operation of the system is usually restricted to one operator at a time, who is in direct arms' reach of the input device connected to the system.

SUMMARY OF INVENTION

One objective is to provide an improved method for controlling certain operations of a surveillance system; such improved method can, for example, provide a faster, easier and more intuitive method for controlling video management software of a surveillance camera.

According to one aspect of the invention, there is provided a computer-implemented method which controls aspects of a surveillance system using gestures and/or voice commands. The method comprises: receiving one or both of an operator's skeleton input data and voice input data from a gesture detection device and a microphone; matching one or both of the received skeleton input data with a gesture stored in a database and the received voice input data with a text string stored in the database; matching one or both of the gesture and text string to a corresponding video management program command stored on the database; and transmitting the one or more video management program commands to a video management program of the surveillance system.

The step of matching the receiving skeleton data with a gesture can comprise storing frames of skeleton input data received over a defined time frame in a gesture list, then determining whether the stored frames match a set of parameters that define the gesture. The database can comprise multiple gestures comprising discrete physical gestures and continuous physical gestures. In such case, the method further comprises determining an operating state of the video management program, then matching the received skeleton data with a gesture selected from a group of discrete physical gestures or a group of continuous physical gestures depending on the determined operating mode. Examples of discrete physical gestures include "swipe left", "swipe right", "swipe up", and "swipe down". The corresponding video management program command to the "swipe left" gesture causes a selected panel in a grid of panels displayed by the video management program to switch places a panel to the left. The corresponding video management program command to the "swipe right" gesture causes a selected panel in a grid of panels displayed by the video management program to switch places a panel to the right. The "swipe up" gesture causes a selected panel in a grid of panels displayed by the video management program to switch places a panel above. The "swipe down" gesture causes a selected panel in a grid of panels displayed by the video management program to switch places a panel below. Examples of continuous physical gestures include "TimeLine Scrubbing" and "Video Panning and Zooming". The corresponding video management program command to the "TimeLine Scrubbing" gesture causes a cursor of a displayed timeline to be moved in the direction of the TimeLine Scrubbing gesture. The corresponding video management program command to the "Video Panning and Zooming" gesture causes a part of a video stream to be moved about a panel in the direction of the Video Panning and Zooming gesture.

The step of matching the received voice input data with a text string stored in the database can comprise using a speech recognition engine to convert the voice input data into a text string, then determining if the converted text string matches a recognized text string stored on the database.

According to another aspect of the invention, there is provided a surveillance system comprising: a surveillance camera; one or both of a gesture capture device and a microphone; and a computer communicative with the surveillance camera and with one or both of the gesture capture device and the microphone. The computer comprises a processor and a computer readable medium having stored thereon a video management program and an interpreting software component program. The interpreting software component program comprises a database and program code executable by the processor to perform a method comprising the following steps: receiving one or both of an operator's skeleton input data from the gesture capture device and voice input data from the microphone; matching one or both of the received skeleton input data with a gesture stored in the database and the received voice input data with a text string stored in the database, using the processor; matching one or both of the gesture and text string to a corresponding video management program command stored on the database, using the processor; and transmitting the one or more video management program commands to the video management program.

According to yet another aspect of the invention, there is provided a computer readable medium having stored thereon an interpreting software program comprising a database and program code executable by a processor to perform a method for controlling aspects of a surveillance system using gestures or voice commands. This method comprises: receiving one or both of an operator's skeleton input data and voice input data; using a processor to match one or both of the received skeleton input data with a gesture stored on the database and the received voice input data with a text string stored on the database; using the processor to match one or both of the gesture and text string to a corresponding video management program command stored on the database; and transmitting the one or more video management program commands to a video management program of a surveillance system.

DETAILED DESCRIPTION

Embodiments described herein relate to a computer implemented method for controlling aspects of a surveillance system using gestures captured by a gesture detection device (e.g. one or more cameras) and audio commands captured by a microphone. More particularly, the described embodiments comprise an interpreting software component that is communicative with a video management program of the system, to send command instructions to the video management program in place of manual input devices like a keyboard, joystick and mouse. The interpreting software component is also communicative with a gesture detection device and a microphone to receive operator skeleton input data and operator voice input data. The interpreting software component comprises a database of command instructions compatible with the video management program and gestures and/or text strings associated with the command instructions. The interpreting software component also comprises a set of gesture interpretation algorithms for associating received skeleton input data with a gesture in the database, and speech recognition algorithms for associating received voice input data with a text string in the database. The speech recognition algorithms can be provided by an application program interface (API) integrated into or communicative with the interpreting software component. Once the gestures and/or text strings have been determined by the respective gesture interpretation and speech recognition algorithms, the interpreting software component then associates a command instruction in the database with the gestures and/or text strings, and sends the command instructions to the video management program.

Figure 1:
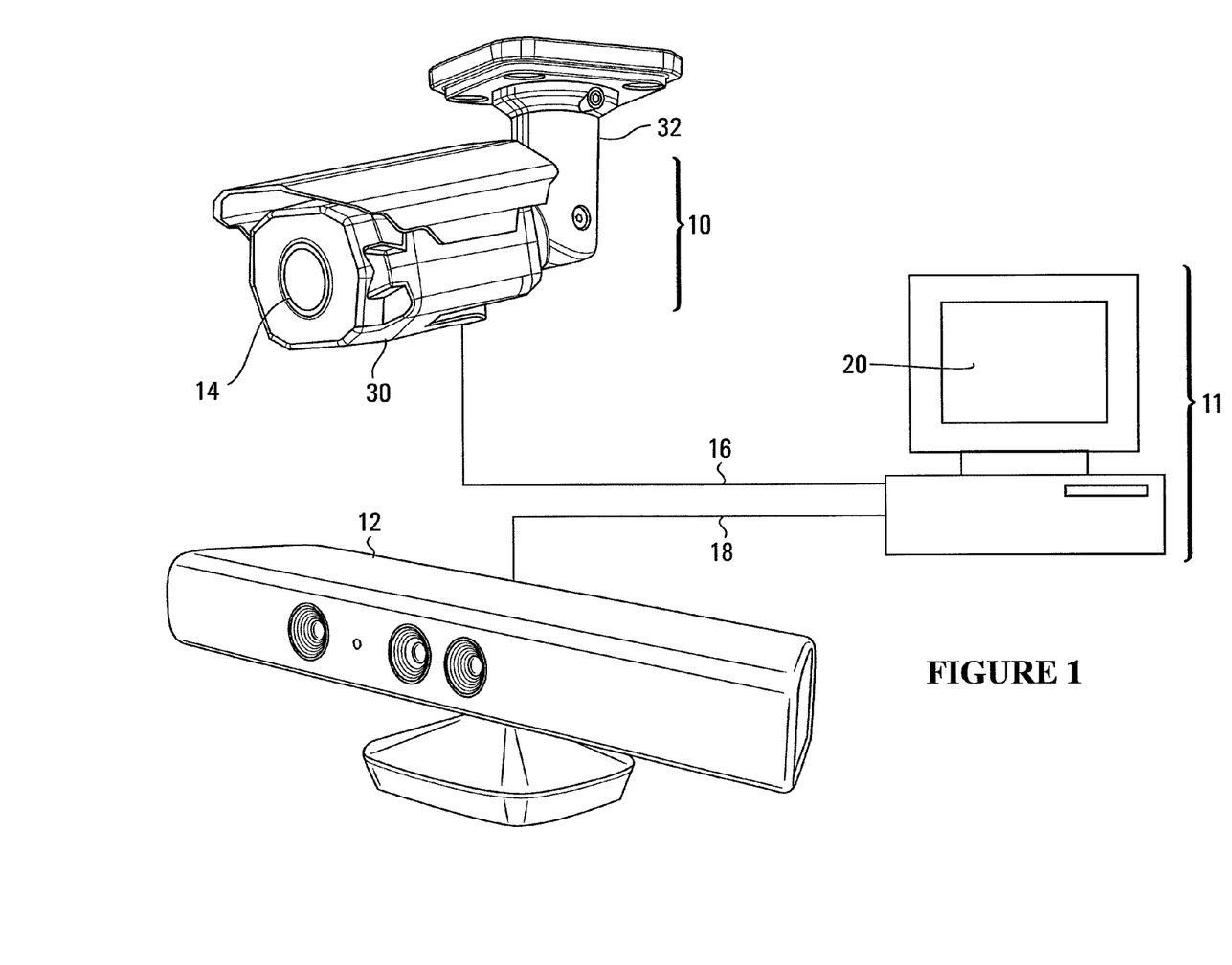
FIG. 1 is a schematic block diagram of components of a surveillance system according to one embodiment.

Referring to FIG. 1 and according to one embodiment, a surveillance system 1 generally comprises a surveillance camera 10, a computer 11 communicative with the camera 10, and a gesture and voice input device 12 communicative with the computer 11. The surveillance camera 10 has a housing 30 for housing camera components, and a movable mount 32 for mounting the rest of the camera 10 to a surface such as a ceiling. A zoom lens 14 is mounted at the front of the housing 30. A camera communications cable 16 is coupled to the camera 10 and the computer 11 and enables two-way communication between the camera 10 and computer 11 such that image data captured by the camera 10 can be transmitted to the computer 11 and camera operation commands can be transmitted by the computer 11 to the camera 10. Suitable cameras for use in the system 1 include those provided by Avigilon Corporation, such as their HD Bullet Cameras.

A user interface communications cable 18 is coupled to the computer 11 and gesture and voice input device 12 and enables two-way communication between the gesture and voice input device 12 and the computer 11 such that a user's skeleton input data and voice input data captured by the gesture and voice input device 12 can be transmitted to the computer 11, and device operating commands can be transmitted from the computer 11 to the gesture and voice input device 12.

In this embodiment, a single device 12 contains both gesture and voice detection sensors. Alternatively, two separate devices can be provided to record gesture and voice inputs separately (not shown). One suitable gesture and voice input device 12 is the Microsoft's Kinect™ sensor array and related software. The Kinect™ sensor array is a physical device that contains cameras, a microphone array and an accelerometer, as well as a software pipeline that processes color, depth, and skeleton data. The related software includes Kinect for Windows™ API ("Kinect API"), which comprises a Natural User Interface (NUI) that allows an applications software developer to access the audio, color image, and depth data streamed from the Kinect sensor array for a Kinect-enabled application. The Kinect API includes algorithms that can recognize and track a human body, by converting depth data into skeleton joints in the human body; skeletons for up to two people at a time can be created and tracked. The Kinect API also integrates with the Microsoft Speech™ API to allow a developer to implement a speech recognition engine into the Kinect-enabled application.

Figure 2:
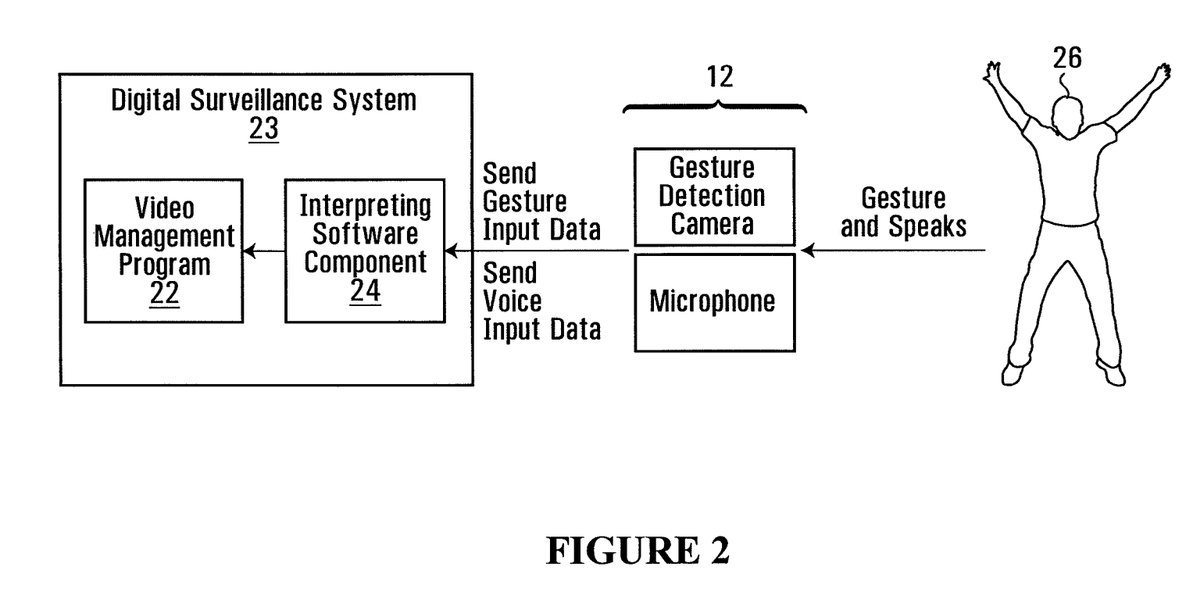
FIG. 2 is a logic diagram of the functions performed by components of the surveillance system including an interpreting software component.

Referring now to FIGS. 1 and 2, the computer 11 comprises a display 20, a processor (not shown) and a computer readable medium 23 having stored thereon a video management program 22 and the interpreting software component 24. The processor, display and memory can be part of a personal computer like a laptop or desktop PC, or be components of a commercial scale server and client system in a manner that is well known in the art. Both the video management program 22 and interpreting software component 24 are executable by the processor to implement method steps encoded in the respective software programs. In particular, the interpreting software component 24 will receive operator skeleton and voice input data from the gesture and voice input device 12, associate gestures and/or text strings stored in the computer storage medium with each received skeleton and voice input data, associate the associated gestures and/or text strings with a corresponding video management program command, then transmit the video management program command(s) to the video management program 22.

The video management program 22 can be an open source software application such as ZoneMinder™, or be a proprietary software application such as the Avigilon Action Centre™ Such programs typically support cameras from a number of manufacturers, and can be integrated into legacy third party systems. The video management program 22 should be communicative with one or more surveillance cameras to receive captured image data (in the form of a series of image stills and/or a continuous video stream) and be operable to control operation of the surveillance camera(s), as well as to record, display and manipulate images and videos taken by the camera(s).

For example, the Avigilon Action Centre™ program can interface with up to 128 cameras per server, provides for joystick control and mobile device input control, and has a number of recording, search and playback features including: jog dial search, thumbnail image search, pixel search (to detect motion events within a scene). The Avigilon Action Centre™ can also display multiple video streams concurrently on a single display, change the layout of the video streams on the display, call up a video stream from a camera by the camera's assigned name and number, change zoom levels of video streams, and switch between live and recorded video.

As another example, the ZoneMinder™ program has many of the same features as the Avigilon Action Centre™, including:
  Multiple zones (regions of interest) can be defined per camera. Each can have a different sensitivity or be ignored altogether.

Web interface allowing full control of system or cameras as well as live views and event replays.

Supports live video in MPEG video, multi-part JPEG, and stills formats.

Supports event replay in MPEG video, multi-part JPEG, and stills formats along with statistics detail.

User defined filters allowing selection of any number of events by combination of characteristics in any order.

Event notification by e-mail or SMS, including attached still images or video of specific events by filter.

Automatic uploading of matching events to external FTP storage for archiving and data security.

Includes bi-directional X10 (home automation protocol) integration allowing X10 signals to control when video is captured and for motion detection to trigger X10 devices.

Partitioned design allows other hardware interfacing protocols to be added for support of alarm panels, etc.

The interpreting software component 24 can be adapted to interface with the specific functions of each video management program. For example, with the ZoneMinder program, the interpreting software component 24 will interface with the API of the ZoneMinder™ program relating to controlling various operations of the program, such as control of zooming and panning values. The interpreting software component 24 thus uses the API to send commands in the form of X, Y, and Z values needed for such panning and zooming, or any other form the API requires. ZoneMinder™ uses a web interface to control a camera; conventional interfacing with ZoneMinder™ involves sending commands via a mouse or keyboard, which are interpreted using a web technology such as javascript or HTML and then sent to the ZoneMinder™ server or other components. In a similar manner, the interpreting software component 24 can be programmed to generate commands in the form of appropriate javascript or HTML values from gesture and text strings, which have been interpreted from skeleton and voice input data (as will be explained in detail below).

Instead of interfacing with a video management program's API for external input control, the interpreting software component 24 can interface directly with the video management program in which the program code of the video management program would be modified as necessary.

Voice-Activated Commands

The interpreting software component 24 in this embodiment is a Kinect-enabled application that incorporates the Kinect™ API and the Microsoft Speech™ API. Alternatively, the interpreting software component 24 can be adapted for use with other gesture and voice input sensor devices, and would be modified to use the software interface APIs associated with those other devices in the manner as is known in the art.

The Microsoft Speech™ API ("SAPI") is speech recognition engine. The SAPI implements the low-level details need to control and manage the real-time operations of a speech recognition engine. In particular, the SAPI converts the voice input data into computer readable text strings or files in a manner that is known in the art. The interpreting software component 24 uses the SAPI to convert the voice input data into a text string, and then tries to match the text string with one of the video management program commands stored in memory. The following is a non-exhaustive and exemplary list of possible video management program commands and their associated text strings converted from voice input data:

Start tracking—text string: "Start Tracking".

Stop tracking—text string: "Stop Tracking".

Maximize a selected video panel in a grid of video panels to cover the entire monitor—text string: "Maximize".

Minimize a video panel covering the entire screen into one panel amongst a grid of video panels—text string: "Minimize".

The following 3 commands are used when the video management program 22 shows a grid of video panels on the display, with the panels numbered consecutively left to right, row by row, starting at 1 for top most left panel and ending at the number of panels for the bottom most right panel. For example, in a 3 rows by 4 columns grid, the top most left panel would receive the panel number 1, the second panel on the second row would be numbered panel 6 and the bottom most right panel would be number 12:

For each video panel in a grid of video panels, display the panel number—text string: "Show Panel Numbers".

Display a video stream from a specific named camera (cameras can be assigned names in a digital surveillance system) onto a numbered video panel in a grid of video panels—text string: "Add camera <camera name> to panel <panel number>". For example, "Add camera Elevator to panel five.

Focus a specific video panel by its number in a grid of video panels (a focused panel will be later the target of other actions like zooming)—text string: "Select Panel <number>". For example, "Select Panel three".

Display recorded video data instead of live video data—text string: "Recorded Video".

Display live video data instead of recorded video data—text string: "Live Video".

Select a specific day from which to display recorded video data—text string: "Go To <Month> <day of month>. For example "Go To December Eight".

Select a specific time of day from the selected day from which to display recorded video data—text string: "Set Time To <time of day> <AM/PM>. For example "Set Time To 4 twelve PM".

Set the focus of the digital surveillance system to its "TimeLine" (the TimeLine is a component which shows a time range and can be used to pick a specific date and time from which to show recorded video data)—text string: "Select Time Line".

Narrow the time range displayed in the Time Line (which enables a finer resolution control of time values selected in the TimeLine). This command will execute only if the focus of the digital surveillance system is on the TimeLine (see the previous command). This action can be done in continuous steps, e.g. one every 0.1 seconds, each narrowing the displayed time range in the TimeLine by 5% and will continue until stopped (see the Stop audio command) or until the highest level of time resolution has been reached—text string: "Zoom In".

Increase the time range displayed in the Time Line. This command is the identical to the "Zoom In" audio command in all aspects except it will increase the time range displayed in the TimeLine rather than narrow it—text string: "Zoom Out".

Stop narrowing or increasing the time range in the Time-Line. This will have effect only if the Zoom In or Out command was given before it—text string: —"Stop".

Gesture-Activated Commands

In this embodiment, the Kinect sensor array 12 will convert captured video of an operator 26 and send skeleton input data via the Kinect API to the interpreting software component 24. The interpreting software component 24 contains a set of gesture interpretation algorithms which can determine whether the skeleton input data captured over a defined time frame (e.g. 0.25 seconds) matches certain parameters that define a recognized gesture. As frames of skeleton input data are inputted from the gesture and voice input device 12 over the defined time frame, a gesture list is built containing joint locations and times for each location (for example, a gesture list can be set to contain the latest 35 locations and times) and stored on a database of the computer memory. This gesture list is later used to determine if the recorded locations over time match a recognized gesture in the database.

The recognized gestures can be categorized generally as discrete physical gestures and continuous physical gestures. Discrete physical gestures are those that occur only once during a defined time frame, i.e. they are completed within the time frame and do not continue continuously beyond the end of the time frame. Continuous physical gestures continue beyond the defined time frame, and do not stop until the operator lowers his/her hand or tells the system 1 to stop tracking. The interpreting software component will access a set of discrete physical gestures or a set of continuous physical gestures stored on the database based on which operating state the video management program is in at the time the operator made the gesture. That is, the gesture interpreting algorithm will try to match the skeleton input data with either a discrete physical gesture or with a continuous physical gesture depending on the operating state of the video management program.

The recognized discrete physical gestures include "Swipe Left", "Swipe Right", "Swipe Up", and "Swipe Down", and the recognized continuous physical gestures include "TimeLine Scrubbing" and "Video Panning and Zooming". Each of these recognized gestures are stored in the database along with an associated video management program command. The Swipe Left gesture is triggered by a swipe left of the right hand and is associated with a command that causes a selected panel in a grid of panels to switch places with the panel on its left. The Swipe Right gesture is triggered by a swipe right of the operator's right hand and is associated with a command that causes a selected panel in a grid of panels to switch places with the panel on its right. The Swipe Up gesture is triggered by a swipe up of the right hand and is associated with a command that causes a selected panel in a grid of panels to switch places with the panel above it. The Swipe Down gesture is triggered by a swipe down of the right hand and is associated with a command that causes a selected panel in a grid of panels to switch places with the below it. The TimeLine Scrubbing gesture is triggered when a Select Time Line state of the video management program is activated that focuses on a time line, by moving the right hand left or right and is associated with a command that moves a cursor of the displayed time line in the direction of the hand movement; this enables control of which recorded display data is displayed. The Video Panning and Zooming gesture is triggered when a Select Panel state of the video management program 22 has been activated, by moving the right hand in space (left, right, up, down, towards and away) relative to the gesture and voice input device 12 and is associated with selecting a particular part of the video stream to display on the panel.

A gesture interpretation algorithm for interpreting swipes is provided to determine if a swipe was gestured, based on the following parameters:

1. The hand must be at least a certain distance (e.g. 0.4 meters) away from the operator's chest.
2. The swipe had to be completed with the defined time frame (e.g. 0.25 seconds).
3. Get all locations of the joint (e.g. the right hand) within the last defined time frame (0.25 seconds) from the list.
4. There has to be at least a threshold amount of joint locations (e.g. 7) which occurred in the last defined time frame in the list.
5. All the locations of the joint in the last time frame need to be following the direction of the swipe (right or left or up or down). For that to happen, the joints locations over the time frame need to advance relative to each other in the same direction (the direction of the swipe) without going at the opposite direction at all and without deviating to a perpendicular direction more than a threshold (e.g. 0.1 meters).
6. If the distance between the latest location of the joint and the oldest location of the joint within the defined time frame is over a threshold (e.g. 0.15 meter) a swipe is identified.

The following is an example of the gesture interpretation algorithm determining whether received skeleton input data indicates the "Swipe Left" gesture:

1. Get the latest location of the right hand and the chest of the operator.
2. Add the latest location to the gesture list of latest locations.
3. Check the distance between the right hand and chest. If it is more than 0.4 meters, then conclude there was no swipe and stop the gesture interpretation algorithm.
4. Get all locations of the joint from the gesture list that occurred within the last 0.25 seconds and store in a separate list entitled Time Frame List.
5. If there are less than seven (7) locations in the Time Frame List, then conclude that there was no swipe and stop the gesture interpretation algorithm.
6. Compare the latest joint location with all other joint location in the Time Frame List, and confirm that the latest joint location is to the left of all other locations in the list.
7. Compare the latest joint location with all other joint location in the Time Frame List. It must have a vertical distance (up or down) from any of them no higher than 0.1 meters.
8. If the horizontal distance between the first (oldest) member of the Time Frame List and the latest (just arrived) member is greater than 0.15 meter then register a "Swipe Left" gesture.

Figure 3:
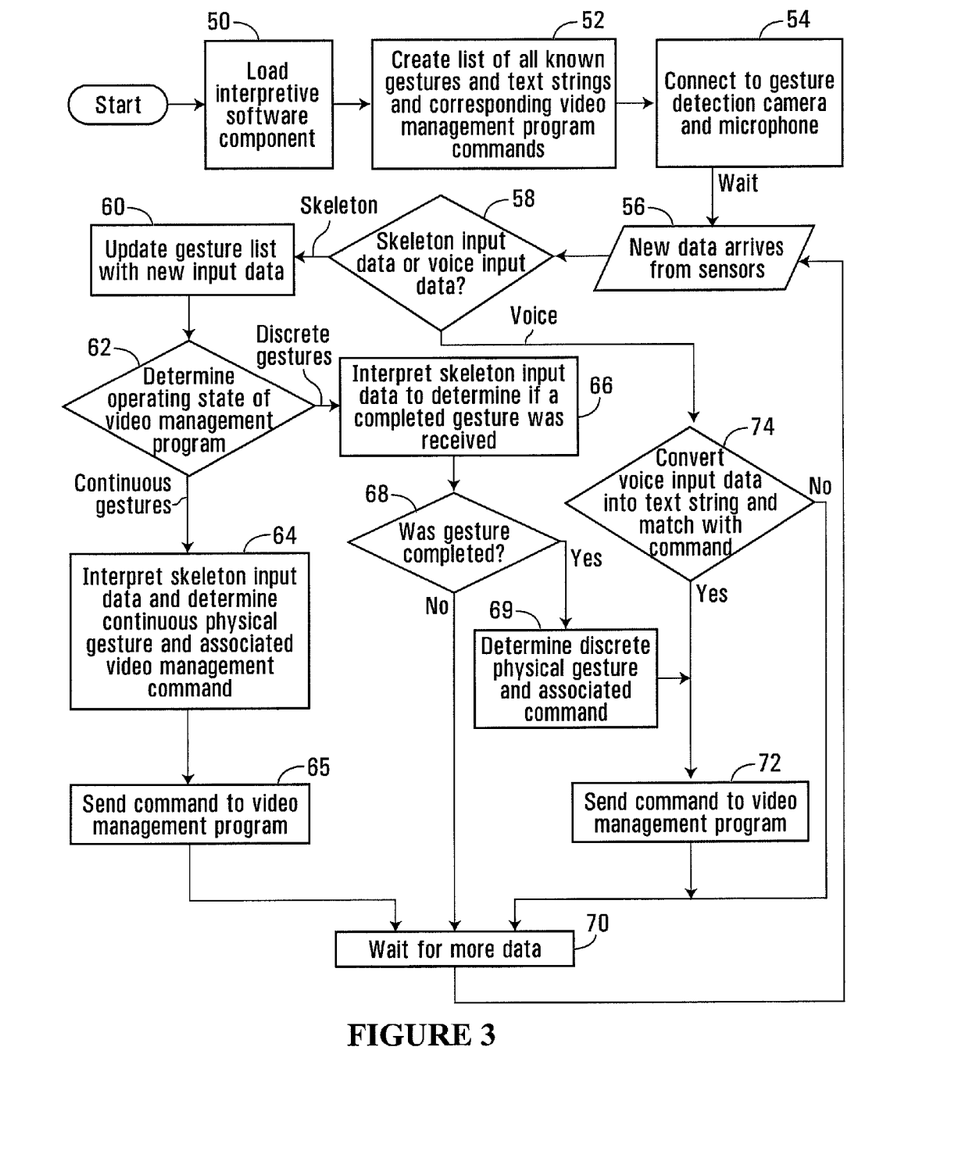
FIG. 3 is a flowchart of steps performed by the interpreting software component in response to gesture and audio inputs received from the input device shown in FIG. 2.

Referring now to FIG. 3, the interpreting software component 24 contains a number of programmed method steps that are executed by the computer processor to interpret the input data received from the user interface device 12 into commands that are compatible with the video management program 22, then output those commands to the video management program 22.

At start-up the processor loads both the video management program 22 and the interpreting software component 24 (step 50). As part of the loading process, a list of gestures and text strings and the corresponding commands are loaded into memory of the processor (step 52), and a communications connection is established with the gesture and voice input device 12 and starts "listening" for input data (step 54). When new input data arrives from the gesture and voice input device 12 (step 56), the interpreting software component 24 determines whether the new data is skeleton input data or voice input data (step 58).

When the new data is determined to be skeleton input data, the interpreting software component 24 updates the gesture list over the defined time frame with the new skeleton input data (step 60). The interpreting software component 24 then determines if the video management program 22 is in an operating state that is commanded by discrete physical gestures or by continuous physical gestures (step 62). If the latter, then the interpreting software component 24 executes the gesture interpretation algorithm for continuous physical gestures to match the skeleton input data stored on the gesture list to a recognized continuous physical gesture, then associates a particular video management program command with the matched continuous physical gesture, e.g. a particular panning/zooming command if the video management program is in a selected panel mode or a particular timeline scrubbing command if the video management program is in timeline focused mode (step 64). The interpreting software component then sends the associated command to the video management program (step 65); for example, video panning and zooming data is sent in the form of X, Y, Z values to the video management program 22.

When the video management program is in an operating state that is commanded by discrete physical gestures, the interpreting software component applies the gesture interpretation algorithm to first determine if a completed gesture was received (step 66), by matching the skeleton input data in the gesture list to a recognized discrete physical gesture. If the gesture list does not contain a complete discrete physical gesture, then the interpreting software component 24 returns to step 56 to receive new input data (step 68); if the gesture list does contain a complete discrete physical gesture, then the matched gesture is associated with a video management program command (step 69), and this command is sent to the video management program (Step 72).

When the new input data is determined to be voice input data, then the interpreting software component 24 executes the Microsoft Speech API ("SAPI") speech recognition engine to convert the voice input data into a text string, and then matches the text string to a recognized text string in the database (step 74). If a match is found, then the video management program command associated with the matched text string is sent to the video management program (Step 76). If a match was not found, the interpreting software component waits for more input data (Step 70) and repeats the above process.

While particular embodiments have been described in the foregoing, it is to be understood that other embodiments are possible and are intended to be included herein. It will be clear to any person skilled in the art that modifications of and adjustments to the foregoing embodiments, not shown, are possible. The scope of the claims should not be limited by the preferred embodiments set forth in the examples, but should be given the broadest interpretation consistent with the description as a whole.

Example

The following is exemplary pseudo-code for a gesture interpretation algorithm for matching skeleton input data to a video panning and zooming gesture:

To avoid jitteriness, the algorithm uses only every second frame of data from the gesture input device 12.

X, Y and Z represent a point in the 3D space in front of the gesture sensor.

For each frame of data arriving from the gesture sensor:

If the distance of the right hand to the center of the shoulders is less than 0.3, ignore this frame of data as the hand is too close to the body and the user probably doesn't want to be tracked.

If not less than 0.3:

[Pseudo Code for Panning Right and Left:]
HorizontaValue=(X value of right hand−X value of right shoulder) divided by 0.3
IF HorizontaValue>1 then HorizontaValue=1
IF HorizontaValue<−1 then HorizontaValue=−1
HorizontaValue=HorizontaValue+1
HorizontaValue=HorizontaValue divided by 2
[Pseudo Code for Panning Up and Down:]
VerticalValue=(Y value of right shoulder−Y value of right hand) divided by 0.3
IF VerticalValue>1 then VerticalValue=1
IF VerticalValue<−1 then VerticalValue=−1
VerticalValue=VerticalValue+1
VerticalValue=VerticalValue divided by 2
[Pseudo Code for Getting the Zoom Level:]
3DDistanceBetweenRightHandAndRightShoulder=
Square root of (Square value of (X value of right hand−X value of right shoulder)
   Square value of (Y value of right hand−Y value of right shoulder)
   Square value of (Z value of right hand−Z value of right shoulder))
If 3DDistanceBetweenRightHandAndRightShoulder>than 0.5
Then 3DDistanceBetweenRightHandAndRightShoulder=0.5

The variable HandLogicalLocation has an initial value of 0.3 for the first frame and afterwards has a start value of its value from the previous data frame
HandLogicalLocation=HandLogicalLocation+(3DDistanceBetweenRightHandAndRightHhoulder−HandLogicalLocation) divided by 3
3DDistanceBetweenRightHandAndRightHhoulder= HandLogicalLocation
If 3DDistanceBetweenRightHandAndRightHhoulder>0.5 then
3DDistanceBetweenRightHandAndRightHhoulder=0.5
If 3DDistanceBetweenRightHandAndRightHhoulder>0.3 then
3DDistanceBetweenRightHandAndRightHhoulder=0.3
ZoomValue=(3DDistanceBetweenRightHandAndRightHhoulder−0.3) divided by (0.5−0.3)

ZoomValue, HorizontaValue and VerticalValue are sent to the digital surveillance system and are used to determine which part of the video stream to display.

We claim:

1. A computer-implemented method for controlling aspects of a surveillance system, comprising:
   (a) receiving an operator's skeleton input data;
   (b) matching the received skeleton input data with a gesture stored in a database, using a processor;
   (c) matching the gesture to a corresponding video management program command stored on the database, using the processor; and
   (d) transmitting the video management program command to a video management program of a surveillance system,
   wherein the database comprises multiple gestures comprising discrete physical gestures and continuous physical gestures, and the method further comprises determining an operating state of the video management program, then matching the received skeleton data with a gesture selected from either a group of discrete physical gestures or a group of continuous physical gestures depending on the determined operating state.

2. A method as claimed in claim 1 wherein the step of matching the received skeleton data with a gesture comprises storing frames of skeleton input data received over a defined time frame in a gesture list, then determining whether the stored frames match a set of parameters that define the gesture.

3. A method as claimed in claim 2 wherein the discrete physical gestures comprise "swipe left", "swipe right", "swipe up", and "swipe down", and wherein the corresponding video management program command to the "swipe left" gesture causes a selected panel in a grid of panels displayed by the video management program to switch places a panel to the left, the corresponding video management program command to the "swipe right" gesture causes a selected panel in a grid of panels displayed by the video management program to switch places a panel to the right, the "swipe up" gesture causes a selected panel in a grid of panels displayed by the video management program to switch places a panel above; and the "swipe down" gesture causes a selected panel in a grid of panels displayed by the video management program to switch places a panel below.

4. A method as claimed in claim 3 wherein the "swipe left" gesture is triggered by a swipe left of a hand of an operator of the system, the "swipe right" gesture is triggered by a swipe right of the hand, the "swipe up" gesture is triggered by a swipe up of the hand, and the "swipe down" gesture is triggered by a swipe down of the hand.

5. A method as claimed in claim 4 wherein determining whether the operator has gestured a swipe of the hand comprises:
   (a) obtaining a latest location of the hand and of a chest of the operator;
   (b) adding the latest location of the hand to the gesture list;
   (c) determining a distance between the hand and the chest;
   (d) obtaining all locations of the hand from the gesture list that occurred within a last defined time frame;
   (e) determining whether a threshold number of locations of the hand have been obtained for the last defined time frame;
   (f) comparing a latest location of the hand with all other locations of the hand that have occurred within the last defined time frame;
   (g) determining whether all the locations of the hand in the last defined time frame are following a direction of the swipe without going in an opposite direction or deviating to a perpendicular direction by more than a first threshold;
   (h) determining whether a distance between a latest location of the hand and an oldest location of the hand during the defined time frame is over a second threshold; and
   (i) when
      (i) the distance between the hand and the chest exceeds a minimum distance;
      (ii) the threshold number of locations have been obtained for the last defined time frame;
      (iii) all the locations of the hand in the last defined time frame are following the direction of the swipe without going in the opposite direction or deviating to the perpendicular direction by more than the first threshold; and
      (iv) the distance between the latest location of the hand and the oldest location of the hand during the defined time frame is over the second threshold,
      determining that the operator has gestured the swipe.

6. A method as claimed in claim 2 wherein the continuous physical gestures comprise "TimeLine Scrubbing" and "Video Panning and Zooming" and wherein the corresponding video management program command to the "TimeLine Scrubbing" gesture causes a cursor of a displayed timeline to be moved in the direction of the TimeLine Scrubbing gesture, and wherein the corresponding video management program command to the "Video Panning and Zooming" gesture causes a part of a video stream to be moved about a panel in the direction of the Video Panning and Zooming gesture.

7. A method as claimed in claim 2 wherein the gesture list comprises joint locations and times for each location.

8. A method as claimed in claim 2 further comprising, when the operating state is commanded by the discrete physical gestures:
   (a) prior to matching the received skeleton input data with the discrete physical gesture, determining whether the gesture list contains a complete discrete physical gesture;
   (b) when the gesture list contains the complete discrete physical gesture, proceeding to match the received skeleton input data with the discrete physical gesture; and
   (c) when the gesture list does not contain the complete discrete physical gesture, receiving new skeleton input data.

9. A method as claimed in claim 1 further comprising:
   (a) receiving the operator's voice input data;
   (b) matching the received voice input data with a text string stored in the database, using the processor;
   (c) matching the text string to a corresponding video management program command stored on the database, using the processor; and
   (d) transmitting the video management program command matched to the text string to the video management program,
   wherein the step of matching the received voice input data with a text string stored in the database comprises using a speech recognition engine to convert the voice input data into a converted text string, then determining if the converted text string matches the text string stored in the database.

10. A method as claimed in claim 1 wherein matching the received skeleton data with a gesture comprises storing frames of skeleton input data received over multiple defined time frames in a gesture list, and wherein the discrete physical gestures each begins and ends in one of the defined time frames.

11. A method as claimed in claim 10 wherein the continuous physical gestures each begins in one of the defined time frames and continues continuously beyond the end of the one of the defined time frames.

12. A method as claimed in claim 11 wherein at least one of the continuous physical gestures comprises movement of a hand and ends when the hand is lowered.

13. A surveillance system comprising:
   (a) a surveillance camera;
   (b) a gesture capture device;
   (c) a computer communicative with the surveillance camera and with the gesture capture device, and comprising a processor, and a computer readable medium having stored thereon a video management program and an interpreting software component program, wherein the interpreting software component program comprises a database and program code executable by the processor to perform a method comprising:
      (i) receiving an operator's skeleton input data from the gesture capture device;

(ii) matching the received skeleton input data with a gesture stored in the database, using the processor;

(iii) matching the gesture to a corresponding video management program command stored on the database, using the processor; and (iv) transmitting the video management program command to the video management program, wherein the database of the interpreting software component program comprises multiple gestures comprising discrete physical gestures and continuous physical gestures, and the method performed by the interpreting software component program further comprises determining an operating state of the video management program, then matching the received skeleton data with a gesture selected from either a group of discrete physical gestures or a group of continuous physical gestures depending on the determined operating state.

14. A system as claimed in claim 13 further comprising a microphone communicative with the computer, and wherein the method further comprises:

(a) receiving the operator's voice input data from the microphone;

(b) matching the received voice input data with a text string stored in the database, using the processor;

(c) matching the text string to a corresponding video management program command stored on the database, using the processor; and (d) transmitting the video management program command matched to the text string to the video management program, wherein the interpreting software component program comprises a speech recognition application program interface comprising an algorithm that converts the voice input data into a converted text string.

15. A system as claimed in claim 13 wherein the step of matching the received skeleton data with a gesture performed by the interpreting software component program comprises storing frames of skeleton input data received over a defined time frame in a gesture list, then determining whether the stored frames match a set of parameters that define the gesture.

16. A system as claimed in claim 15 wherein the discrete physical gestures comprise "swipe left", "swipe right", "swipe up", and "swipe down", and wherein the corresponding video management program command to the "swipe left" gesture causes a selected panel in a grid of panels displayed by the video management program to switch places a panel to the left, the corresponding video management program command to the "swipe right" gesture causes a selected panel in a grid of panels displayed by the video management program to switch places a panel to the right, the "swipe up" gesture causes a selected panel in a grid of panels displayed by the video management program to switch places a panel above; and the "swipe down" gesture causes a selected panel in a grid of panels displayed by the video management program to switch places a panel below.

17. A system as claimed in claim 16 wherein the "swipe left" gesture is triggered by a swipe left of a hand of an operator of the system, the "swipe right" gesture is triggered by a swipe right of the hand, the "swipe up" gesture is triggered by a swipe up of the hand, and the "swipe down" gesture is triggered by a swipe down of the hand.

18. A system as claimed in claim 17 wherein determining whether the operator has gestured a swipe of the hand comprises:

(a) obtaining a latest location of the hand and of a chest of the operator;

(b) adding the latest location of the hand to the gesture list;

(c) determining a distance between the hand and the chest;

(d) obtaining all locations of the hand from the gesture list that occurred within a last defined time frame;

(e) determining whether a threshold number of locations of the hand have been obtained for the last defined time frame;

(f) comparing a latest location of the hand with all other locations of the hand that have occurred within the last defined time frame;

(g) determining whether all the locations of the hand in the last defined time frame are following a direction of the swipe without going in an opposite direction or deviating to a perpendicular direction by more than a first threshold;

(h) determining whether a distance between a latest location of the hand and an oldest location of the hand during the defined time frame is over a second threshold; and (i) when
 (i) the distance between the hand and the chest exceeds a minimum distance;
 (ii) the threshold number of locations have been obtained for the last defined time frame;
 (iii) all the locations of the hand in the last defined time frame are following the direction of the swipe without going in the opposite direction or deviating to the perpendicular direction by more than the first threshold; and
 (iv) the distance between the latest location of the hand and the oldest location of the hand during the defined time frame is over the second threshold,
 determining that the operator has gestured the swipe.

19. A system as claimed in claim 15 wherein the continuous physical gestures comprise "TimeLine Scrubbing" and "Video Panning and Zooming" and wherein the corresponding video management program command to the "TimeLine Scrubbing" gesture causes a cursor of a displayed timeline to be moved in the direction of the TimeLine Scrubbing gesture, and wherein the corresponding video management program command to the "Video Panning and Zooming" gesture causes a part of a video stream to be moved about a panel in the direction of the Video Panning and Zooming gesture.

20. A system as claimed in claim 15 wherein the gesture list comprises joint locations and times for each location.

21. A system as claimed in claim 15 further comprising, when the operating state is commanded by the discrete physical gestures:

(a) prior to matching the received skeleton input data with the discrete physical gesture, determining whether the gesture list contains a complete discrete physical gesture;

(b) when the gesture list contains the complete discrete physical gesture, proceeding to match the received skeleton input data with the discrete physical gesture; and (c) when the gesture list does not contain the complete discrete physical gesture, receiving new skeleton input data.

22. A system as claimed in claim 13 further comprising a microphone communicative with the computer, and wherein the method further comprises:

(a) receiving the operator's voice input data from the microphone;

(b) matching the received voice input data with a text string stored in the database, using the processor;
(c) matching the text string to a corresponding video management program command stored on the database, using the processor; and
(d) transmitting the video management program command matched to the text string to the video management program,
wherein the step of matching the received voice input data with a text string stored in the database performed by the interpreting software component program, comprises using a speech recognition engine to convert the voice input data into a converted text string, then determining if the converted text string matches the text string stored in the database.

23. A system as claimed in claim 13 wherein matching the received skeleton data with a gesture comprises storing frames of skeleton input data received over multiple defined time frames in a gesture list, and wherein the discrete physical gestures each begins and ends in one of the defined time frames.

24. A system as claimed in claim 23 wherein the continuous physical gestures each begins in one of the defined time frames and continues continuously beyond the end of the one of the defined time frames.

25. A system as claimed in claim 24 wherein at least one of the continuous physical gestures comprises movement of a hand and ends when the hand is lowered.

26. A non-transitory computer readable medium having stored thereon an interpreting software component program comprising a database and program code executable by a processor to perform a method comprising:
(a) receiving an operator's skeleton input data;
(b) matching the received skeleton input data with a gesture stored on the database, using the processor;
(c) matching the gesture to a corresponding video management program command stored on the database, using the processor; and
(d) transmitting the video management program command to a video management program of a surveillance system,
wherein the database comprises multiple gestures comprising discrete physical gestures and continuous physical gestures, and the method performed by the interpreting software component program further comprises determining an operating state of the video management program, then matching the received skeleton data with a gesture selected from either a group of discrete physical gestures or a group of continuous physical gestures depending on the determined operating state.

27. A computer-readable medium as claimed in claim 26 wherein the method further comprises:
(a) receiving the operator's voice input data;
(b) matching the received voice input data with a text string stored in the database, using the processor;
(c) matching the text string to a corresponding video management program command stored on the database, using the processor; and
(d) transmitting the video management program command matched to the text string to the video management program,
wherein the interpreting software component program comprises a speech recognition application program interface comprising an algorithm that converts the voice input data into a converted text string.

28. A computer-readable medium as claimed in claim 27 wherein the discrete physical gestures comprise "swipe left", "swipe right", "swipe up", and "swipe down", and wherein the corresponding video management program command to the "swipe left" gesture causes a selected panel in a grid of panels displayed by the video management program to switch places a panel to the left, the corresponding video management program command to the "swipe right" gesture causes a selected panel in a grid of panels displayed by the video management program to switch places a panel to the right, the "swipe up" gesture causes a selected panel in a grid of panels displayed by the video management program to switch places a panel above; and the "swipe down" gesture causes a selected panel in a grid of panels displayed by the video management program to switch places a panel below.

29. A computer-readable medium as claimed in claim 28 wherein the "swipe left" gesture is triggered by a swipe left of a hand of an operator of the system, the "swipe right" gesture is triggered by a swipe right of the hand, the "swipe up" gesture is triggered by a swipe up of the hand, and the "swipe down" gesture is triggered by a swipe down of the hand.

30. A computer-readable medium as claimed in claim 29 wherein determining whether the operator has gestured a swipe of the hand comprises:
(a) obtaining a latest location of the hand and of a chest of the operator;
(b) adding the latest location of the hand to the gesture list;
(c) determining a distance between the hand and the chest;
(d) obtaining all locations of the hand from the gesture list that occurred within a last defined time frame;
(e) determining whether a threshold number of locations of the hand have been obtained for the last defined time frame;
(f) comparing a latest location of the hand with all other locations of the hand that have occurred within the last defined time frame;
(g) determining whether all the locations of the hand in the last defined time frame are following a direction of the swipe without going in an opposite direction or deviating to a perpendicular direction by more than a first threshold;
(h) determining whether a distance between a latest location of the hand and an oldest location of the hand during the defined time frame is over a second threshold; and
(i) when
(i) the distance between the hand and the chest exceeds a minimum distance;
(ii) the threshold number of locations have been obtained for the last defined time frame;
(iii) all the locations of the hand in the last defined time frame are following the direction of the swipe without going in the opposite direction or deviating to the perpendicular direction by more than the first threshold; and
(iv) the distance between the latest location of the hand and the oldest location of the hand during the defined time frame is over the second threshold,
determining that the operator has gestured the swipe.

31. A computer-readable medium as claimed in claim 27 wherein the continuous physical gestures comprise "TimeLine Scrubbing" and "Video Panning and Zooming" and wherein the corresponding video management program command to the "TimeLine Scrubbing" gesture causes a cursor of a displayed timeline to be moved in the direction of the TimeLine Scrubbing gesture, and wherein the corresponding video management program command to the "Video Panning and Zooming" gesture causes a part of a video stream to be moved about a panel in the direction of the Video Panning and Zooming gesture.

32. A computer-readable medium as claimed in claim 26 wherein the method further comprises:
 (a) receiving the operator's voice input data;
 (b) matching the received voice input data with a text string stored in the database, using the processor;
 (c) matching the text string to a corresponding video management program command stored on the database, using the processor; and
 (d) transmitting the video management program command matched to the text string to the video management program,
 wherein the step of matching the received voice input data with a text string stored in the database performed by the interpreting software component program, comprises using a speech recognition engine to convert the voice input data into a converted text string, then determining if the converted text string matches the text string stored in the database.

33. A computer-readable medium as claimed in claim 26 wherein the step of matching the received skeleton data with a gesture comprises storing frames of skeleton input data received over a defined time frame in a gesture list, then determining whether the stored frames match a set of parameters that define the gesture.

34. A computer-readable medium as claimed in claim 33 wherein the gesture list comprises joint locations and times for each location.

35. A computer-readable medium as claimed in claim 33 wherein the method further comprises, when the operating state is commanded by the discrete physical gestures:
 (a) prior to matching the received skeleton input data with the discrete physical gesture, determining whether the gesture list contains a complete discrete physical gesture;
 (b) when the gesture list contains the complete discrete physical gesture, proceeding to match the received skeleton input data with the discrete physical gesture; and
 (c) when the gesture list does not contain the complete discrete physical gesture, receiving new skeleton input data.

36. A computer-readable medium as claimed in claim 26 wherein matching the received skeleton data with a gesture comprises storing frames of skeleton input data received over multiple defined time frames in a gesture list, and wherein the discrete physical gestures each begins and ends in one of the defined time frames.

37. A computer-readable medium as claimed in claim 36 wherein the continuous physical gestures each begins in one of the defined time frames and continues continuously beyond the end of the one of the defined time frames.

38. A computer-readable medium as claimed in claim 37 wherein at least one of the continuous physical gestures comprises movement of a hand and ends when the hand is lowered.

* * * * *